(12) United States Patent
Baldwin et al.

(10) Patent No.: US 11,891,168 B2
(45) Date of Patent: Feb. 6, 2024

(54) BEARINGLESS GIMBALED ROTOR HUBS AND SWASHPLATES

(71) Applicant: Textron Innovations Inc., Providence, RI (US)

(72) Inventors: Tyler Wayne Baldwin, Keller, TX (US); Kyle Thomas Cravener, Watauga, TX (US)

(73) Assignee: Textron Innovations Inc., Providence, RI (US)

( * ) Notice: Subject to any disclaimer, the term of this patent is extended or adjusted under 35 U.S.C. 154(b) by 181 days.

(21) Appl. No.: 17/396,095

(22) Filed: Aug. 6, 2021

(65) Prior Publication Data
US 2021/0371094 A1 Dec. 2, 2021

Related U.S. Application Data

(62) Division of application No. 16/004,689, filed on Jun. 11, 2018, now Pat. No. 11,097,837.

(51) Int. Cl.
*B64C 27/41* (2006.01)
*F16C 11/02* (2006.01)
(Continued)

(52) U.S. Cl.
CPC .............. *B64C 27/41* (2013.01); *F16C 11/02* (2013.01); *F16C 17/02* (2013.01); *F16C 33/20* (2013.01);
(Continued)

(58) Field of Classification Search
CPC .......... B64C 27/41; F16C 11/02; F16C 17/02; F16C 33/20; F16D 3/2052; F16D 2003/2026
(Continued)

(56) References Cited

U.S. PATENT DOCUMENTS 1,190,425 A 7/1916 Knox
1,685,510 A 11/1922 Thiemer
(Continued)

FOREIGN PATENT DOCUMENTS

DE 2642964 A1 3/1978
DE 145 656 * 12/1980 ................ 464/125
GB 972516 A 10/1964

OTHER PUBLICATIONS

European Patent Office, "European Search Report," EP Application No. 19166916.7, dated Oct. 30, 2019, 4 pages, published Munich, Germany.

(Continued)

*Primary Examiner* — Greg Binda
(74) *Attorney, Agent, or Firm* — Fogarty LLP

(57) ABSTRACT

A gimbal joint may employ a plurality of wear sleeves, each disposed between a pin or pin receptive bore of a first structure and a corresponding bore or pin of a second structure and between another pin or bore of the second structure and a corresponding bore or pin of a third structure. Each of these structures may be adapted to rotate in a single plane, with one structure adapted to also tilt about a first axis, and one other structure adapted to tilt about a second axis. Each integral flanged wear sleeve may comprise a right circular hollow cylindrical body portion, which may be interiorly sized to be retained on one of the pins and externally sized to be retained in one of the pin receptive bores, and a flange portion may radiate from one end of the cylindrical body portion.

17 Claims, 8 Drawing Sheets

(51) Int. Cl.
*F16C 17/02* (2006.01)
*F16C 33/20* (2006.01)
*F16D 3/205* (2006.01)
*F16D 3/202* (2006.01)

(52) U.S. Cl.
CPC .... *F16D 3/2052* (2013.01); *F16D 2003/2026* (2013.01)

(58) Field of Classification Search
USPC .......................................................... 464/125
See application file for complete search history.

(56) References Cited

U.S. PATENT DOCUMENTS

| | | | | |
|---|---|---|---|---|
| 1,670,175 A | * | 5/1928 | Wikoff | ...................... F16D 3/42 464/125 |
| 2004/0209695 A1 | | 10/2004 | Smith | |
| 2014/0302938 A1 | | 10/2014 | Lidak | |
| 2015/0053814 A1 | | 2/2015 | Stamps | |
| 2017/0204912 A1 | | 7/2017 | Harris | |

OTHER PUBLICATIONS

Response to the 2nd Communication pursuant to Article 94(3) EPC, European Patent Application No. 19166916.7, dated Oct. 13, 2020, 18 pages, publisher Barker Brettell LLP, Birmingham West Midlands, England.

2nd Communication pursuant to Article 94(3) EPC, European Patent Application No. 19166916.7, dated Jun. 19, 2020, 4 pages, publisher European Patent Office, Germany.

Response to the 1st Communication pursuant to Article 94(3) EPC, European Patent Application No. 19166916.7, dated Mar. 24, 2020, 27 pages, publisher Barker Brettell LLP, Birmingham West Midlands, England.

1st Communication pursuant to Article 94(3) EPC, European Patent Application No. 19166916.7, dated Nov. 22, 2019, 7 pages, publisher European Patent Office, Germany.

\* cited by examiner

BEARINGLESS GIMBALED ROTOR HUBS AND SWASHPLATES

CROSS-REFERENCE TO RELATED APPLICATION

This is a divisional of, and claims benefit of, U.S. patent application Ser. No. 16/004,689, also entitled Bearingless Gimbaled Rotor Hubs and Swashplates, filed Jun. 11, 2018, now U.S. Pat. No. 11,097,837 issued Aug. 24, 2021, which is hereby incorporated herein by reference.

TECHNICAL FIELD

The present disclosure relates generally to rotorcraft, more particularly to rotorcraft rotor hubs, and specifically to bearingless gimbaled rotor hubs and swashplates.

BACKGROUND

A rotorcraft (i.e. rotary-wing aircraft, such as helicopters and tiltrotor aircraft) may include one or more rotor systems. At least one rotor provides lift and propulsion forces. These rotors commonly having two or more airfoil blades connected to a rotatable hub.

For example, in a helicopter main rotor system, or in a tiltrotor aircraft, the tilting rotor, may generate aerodynamic lift to support the weight of the rotorcraft in flight and thrust to counteract aerodynamic drag and move the rotorcraft in forward flight. In a helicopter, a tail rotor system may generate thrust in the same direction as the main rotor system's rotation to counter the torque effect created by the main rotor system.

Tiltrotor aircraft may operate in helicopter mode by tilting at least a rotor portion of the craft's nacelles upright and in an airplane mode by tilting the nacelles forward. While in helicopter mode the aircraft may perform vertical maneuverers, including vertical takeoff and landing, as well as hover and sideward movement. Tiltrotor aircraft may generate greater forward speed in airplane mode than in helicopter mode because, in airplane mode, blades are oriented to generate greater thrust propelling the aircraft forward (somewhat analogous to a propeller), Designs of rotors and propellers for aircraft are often extremely complex. A large number of factors must be taken into account, including flexure of the rotor under heavy loads and the required motions of the rotor blades with respect to the drive mechanism. The advent of the tilt rotor aircraft has added performance requirements to the hub assembly, resulting from the more complex operation of the craft. The prop systems on a tiltrotor are very large by comparison with standard aircraft. Hence, considerations for proprotors, used as both propellers and rotors in aircraft such as a tiltrotor aircraft, can be even more complex than usual. For example, prior rotor hubs use elastomeric bearings or metallic roller/ball bearings to allow for rotation (gimbaling) between parts while constraining shear loads. However, such prior bearings are expensive and difficult to replace. For example, replacement of such bearing typically require replacement of one or more surrounding parts.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is directed to systems and methods which provide a gimbal particularly well suited for use in an aircraft rotor hub, swashplate, or the like. In accordance therewith, a gimbal joint may employ a plurality of wear sleeves, each disposed between a pin or pin receptive bore of a first structure and a corresponding bore or pin of a second structure and between another pin or bore of the second structure and a corresponding bore or pin of a third structure. Each of these structures may be adapted to rotate in a single plane, with one structure adapted to also tilt about a first axis, and one other structure adapted to tilt about a second axis. Each integral flanged wear sleeve may comprise a right circular hollow cylindrical body portion, which may be interiorly sized to be retained on one of the pins and externally sized to be retained in one of the pin receptive bores, and a flange portion may radiate from one end of the cylindrical body portion.

Various gimbal embodiments may be adapted to be secured or linked to a proprotor yoke, which is configured to radially mount a plurality of proprotors, or the like and that defines a central driveshaft or mast opening. The gimbal may include an integral universal joint trunnion that has an annular body portion defining a central driveshaft or mast opening, aligned with the proprotor yoke central driveshaft or mast opening, and a plurality of drive pin portions extending from the annular body portion.

A pair of pillow blocks may be secured to the proprotor yoke, with each pillow block defining a trunnion pin receptive bore. A drive coupling may define a splined central driveshaft or mast coupling bore, configured to be mated with a rotor driveshaft or mast end, and opposing trunnion pin receptive bores.

One of a plurality of integral flanged wear sleeves may be disposed in each of the pillow block trunnion pin receptive bores and each of the drive coupling trunnion pin receptive bores, over a respective trunnion drive pin. This rotatably retains the respective trunnion drive pin with respect to the respective pillow block trunnion pin receptive bore or drive coupling trunnion pin receptive bore. Each of the integral flanged wear sleeves has a right circular hollow cylindrical body portion, interiorly sized to be retained on one of the trunnion drive pin portions of the trunnion, and externally sized to be rotatably retained in one of the pillow block trunnion pin receptive bores and/or one of the drive coupling trunnion pin receptive bores. Each of the integral flanged wear sleeves also includes a flange portion, radiating from an outer end of the cylindrical body portion. The flange portion has a diameter larger than a diameter of the pillow block trunnion pin receptive bores and the drive coupling trunnion pin receptive bores, so as to bear on a face of a respective pillow block or drive coupling. A low friction coating or lining is disposed on at least an outer surface of the body portion. The low friction coating or lining may also, or alternatively, be disposed on at least an inner face of the flange portion of each wear sleeve.

Each drive pin portion of the integral trunnion may have a (threaded) longitudinal bore, and a (threaded) fastener may be secured in (threaded and tightened into) each trunnion drive pin longitudinal bore. A head of the fastener may bear on, and tension against, the respective wear sleeve flange, replaceably retaining the respective wear sleeve on the respective trunnion drive pin and replaceably retaining the flanged wear sleeve and trunnion in place.

Hence, a process for gimbaling a rotor hub, swashplate, or the like, may, for example include disposing integral flanged wear sleeves between pins or pin receptive bores of a first structure and corresponding pin receptive bores or pins of a second structure. This first structure may be adapted to, for example rotate in a single plane and the second structure may, for example, be adapted to rotate in the single plane and tilt relative to the single plane about a first axis parallel to the single plane. Other integral flanged wear sleeves may be disposed between other pins or pin receptive bores of the second structure and corresponding pin receptive bores or pins of a third structure. This third structure may be adapted to rotate in the single plane and tilt relative to the single plane about a second axis parallel to the single plane and perpendicular to the first axis.

In accordance with the foregoing, in a rotor hub implementation, or the like, the first structure, for example, may be splined to a mast or driveshaft of a proprotor aircraft, and proprotors of the aircraft may, by way of example, be mounted to the third structure, such as a proprotor yoke.

Additionally, or alternatively, in a swashplate implementation, or the like, another first structure may be splined to a mast or driveshaft of a proprotor aircraft for movement along the mast or driveshaft, perpendicular to the single plane and another third structure may be linked to proprotors of the aircraft.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 1:
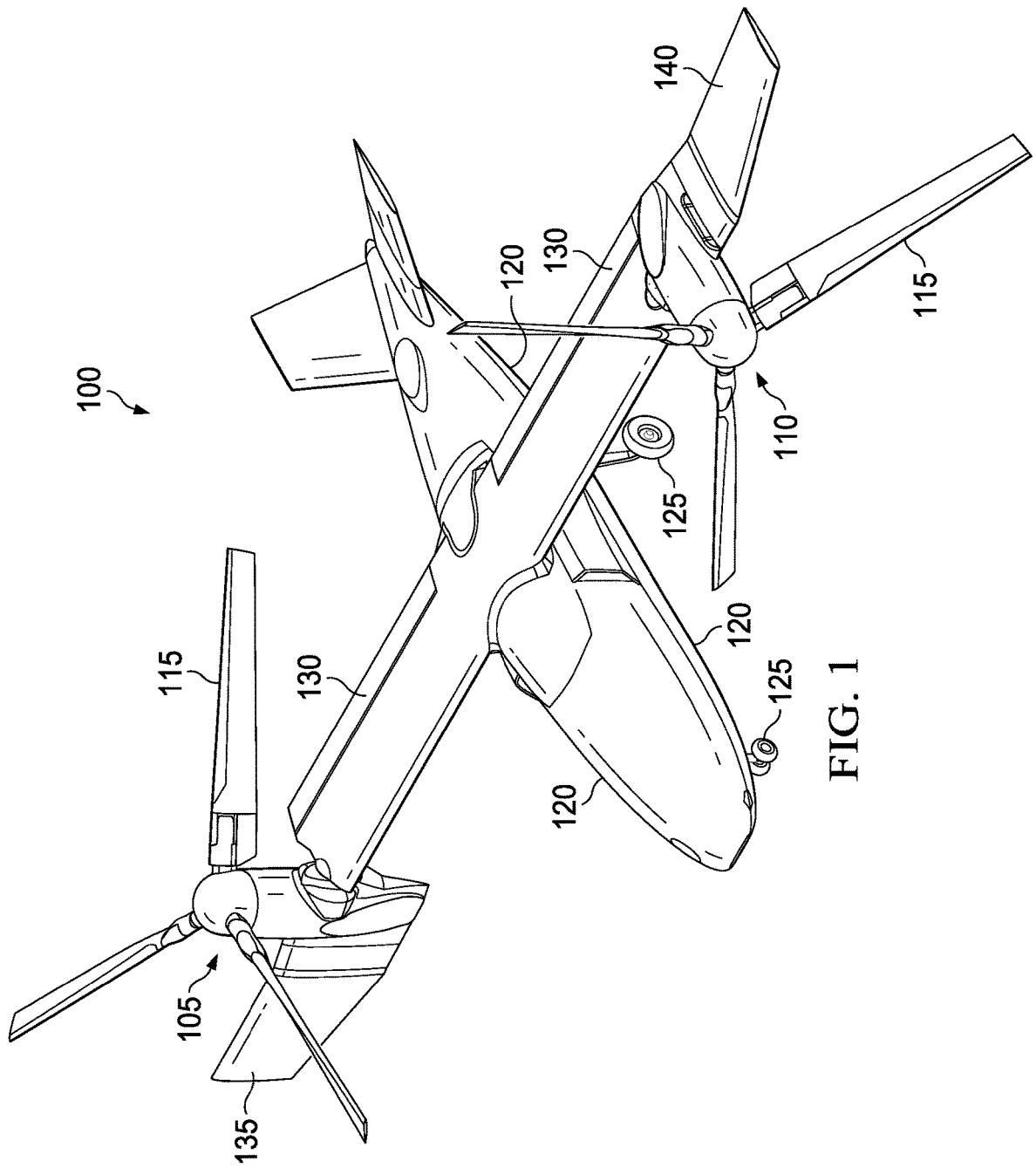
Figure 2:
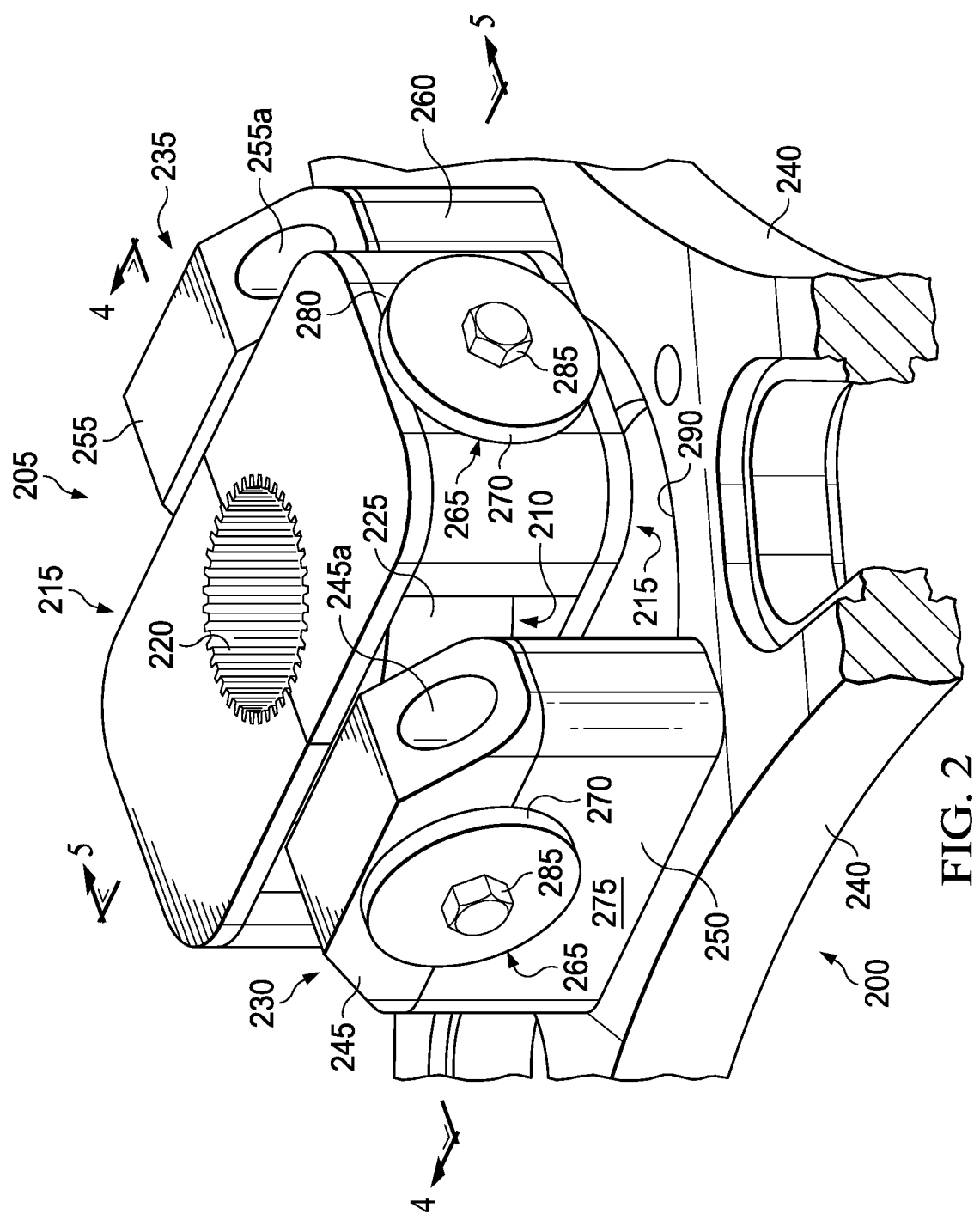
Figure 3:
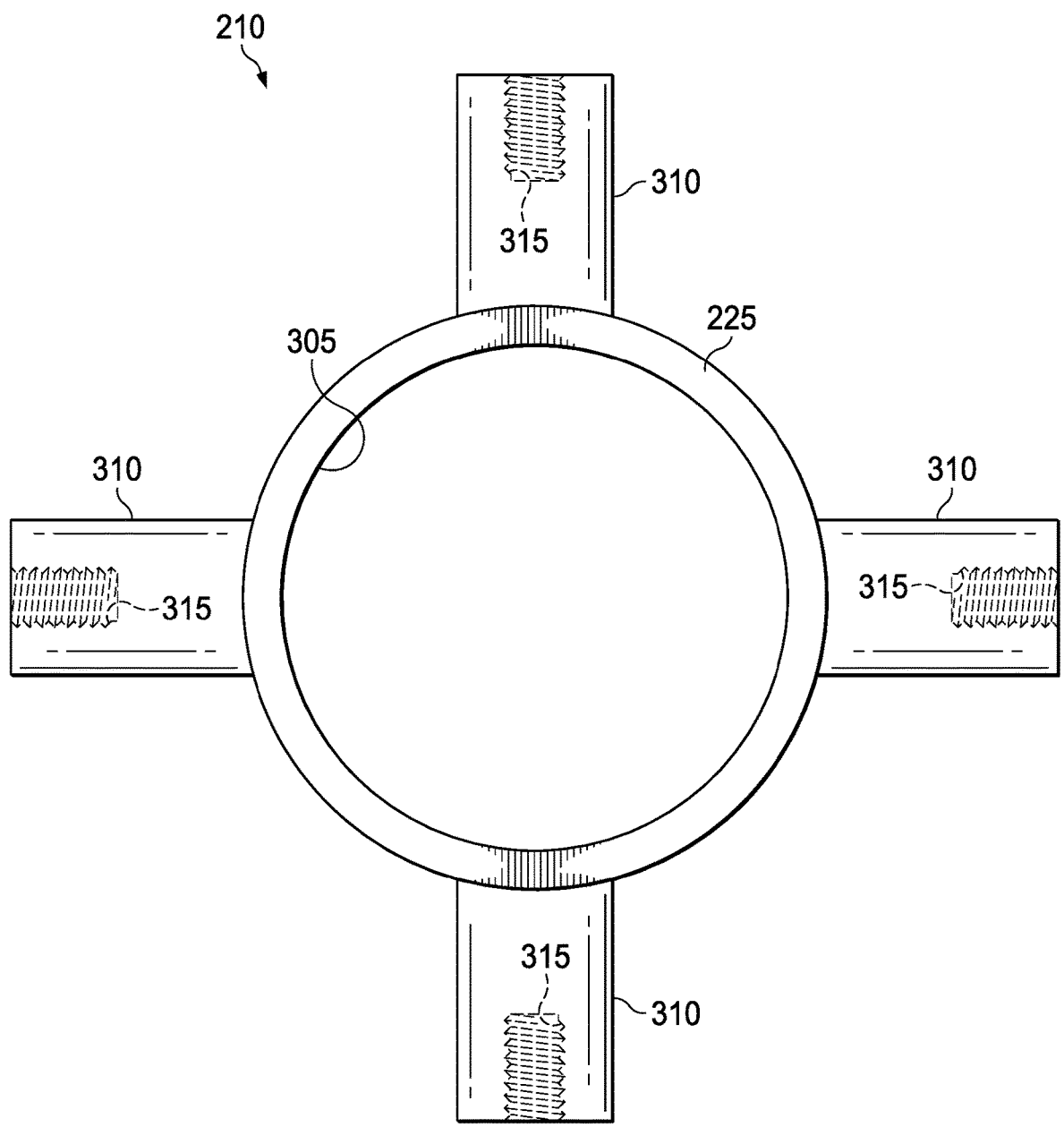
Figure 4:
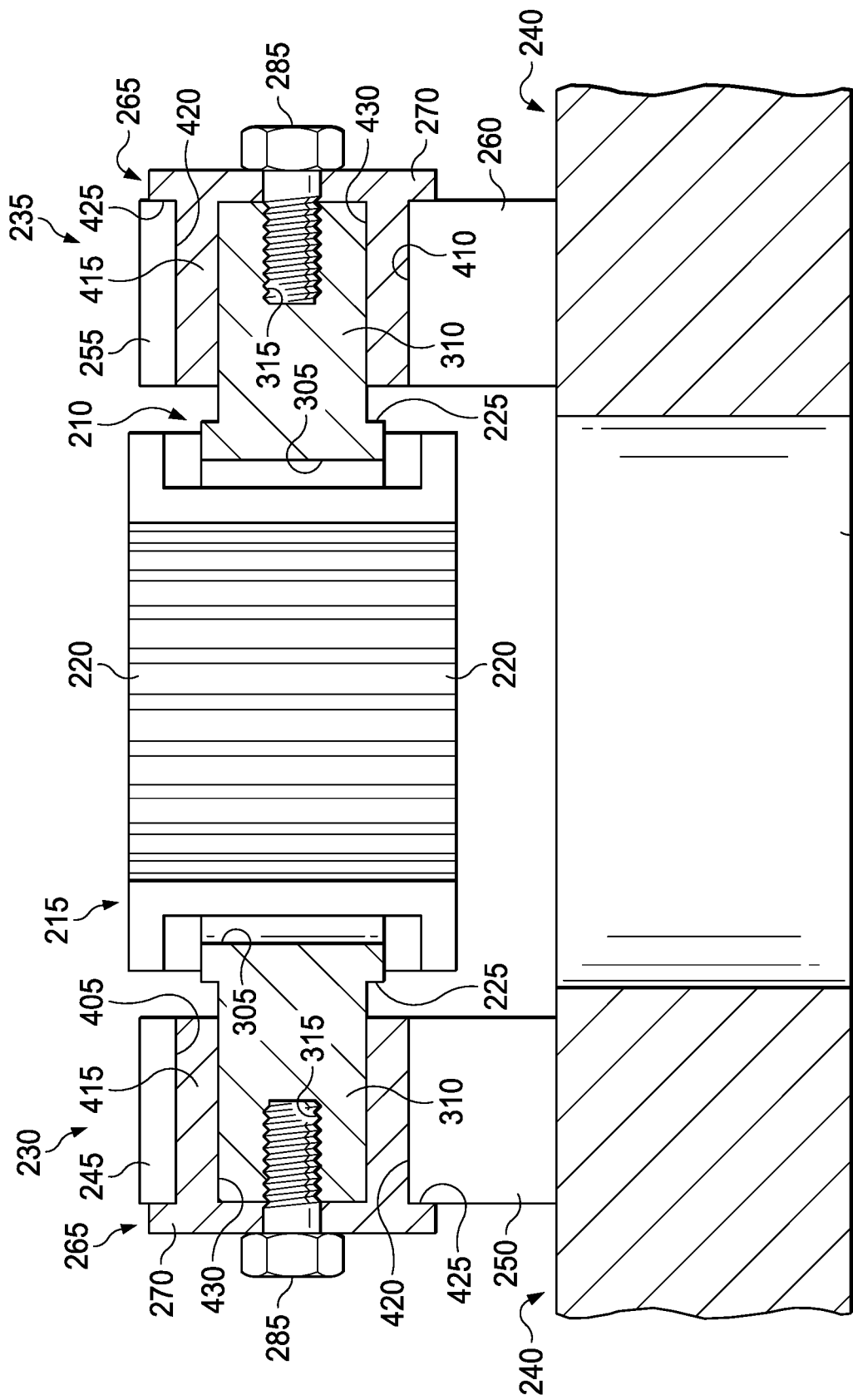
Figure 5:
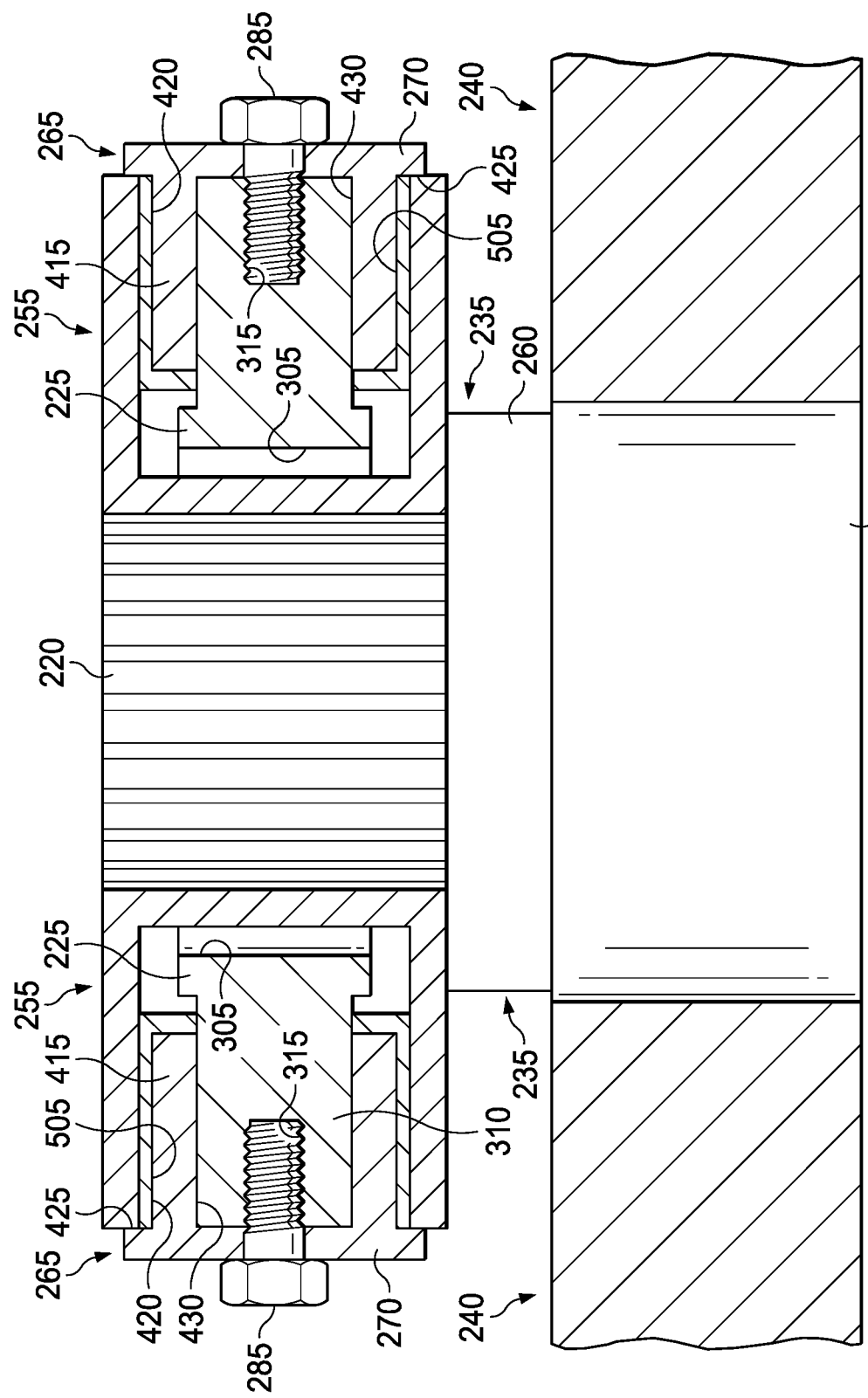
Figure 6:
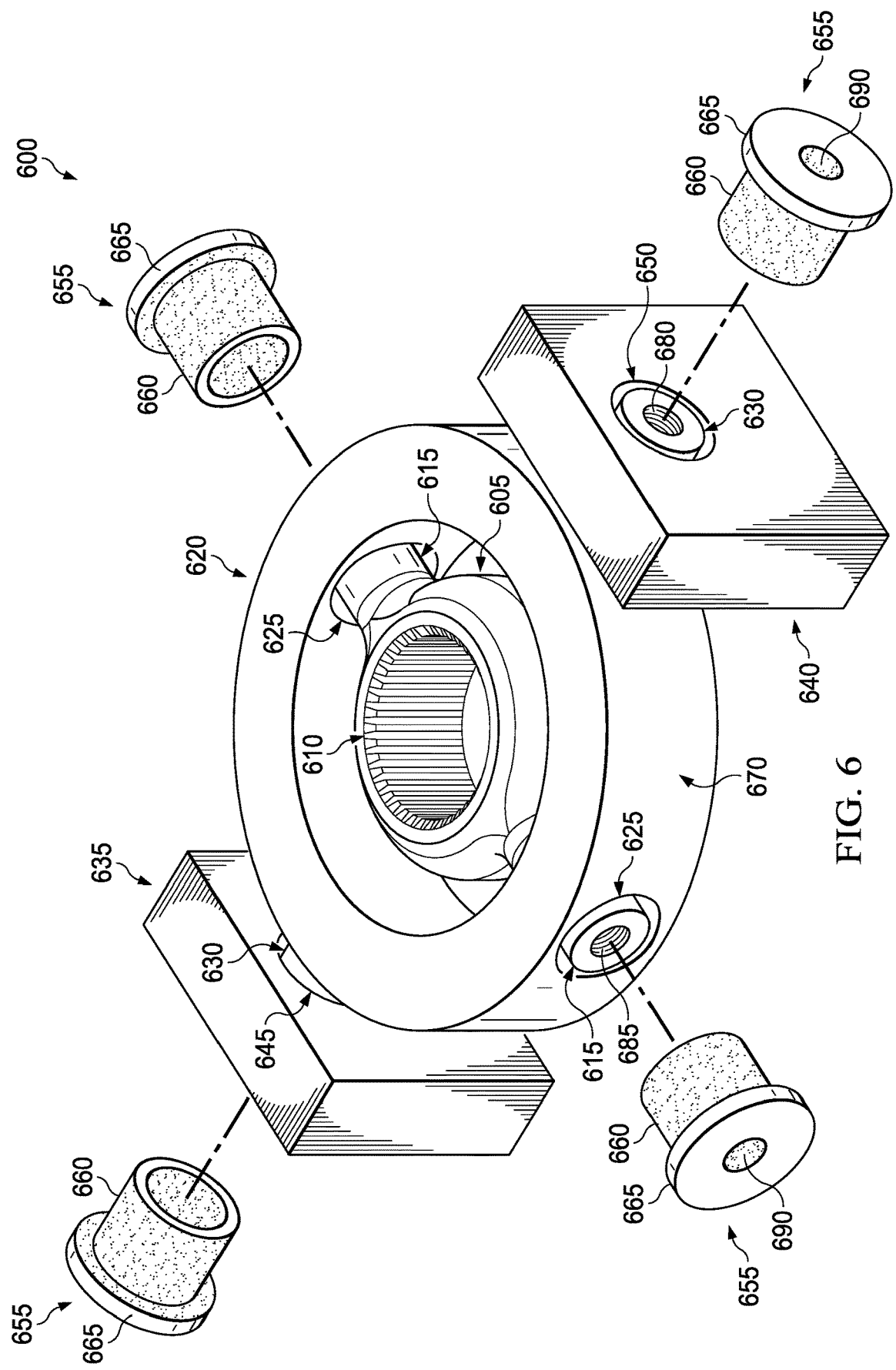
Figure 7:
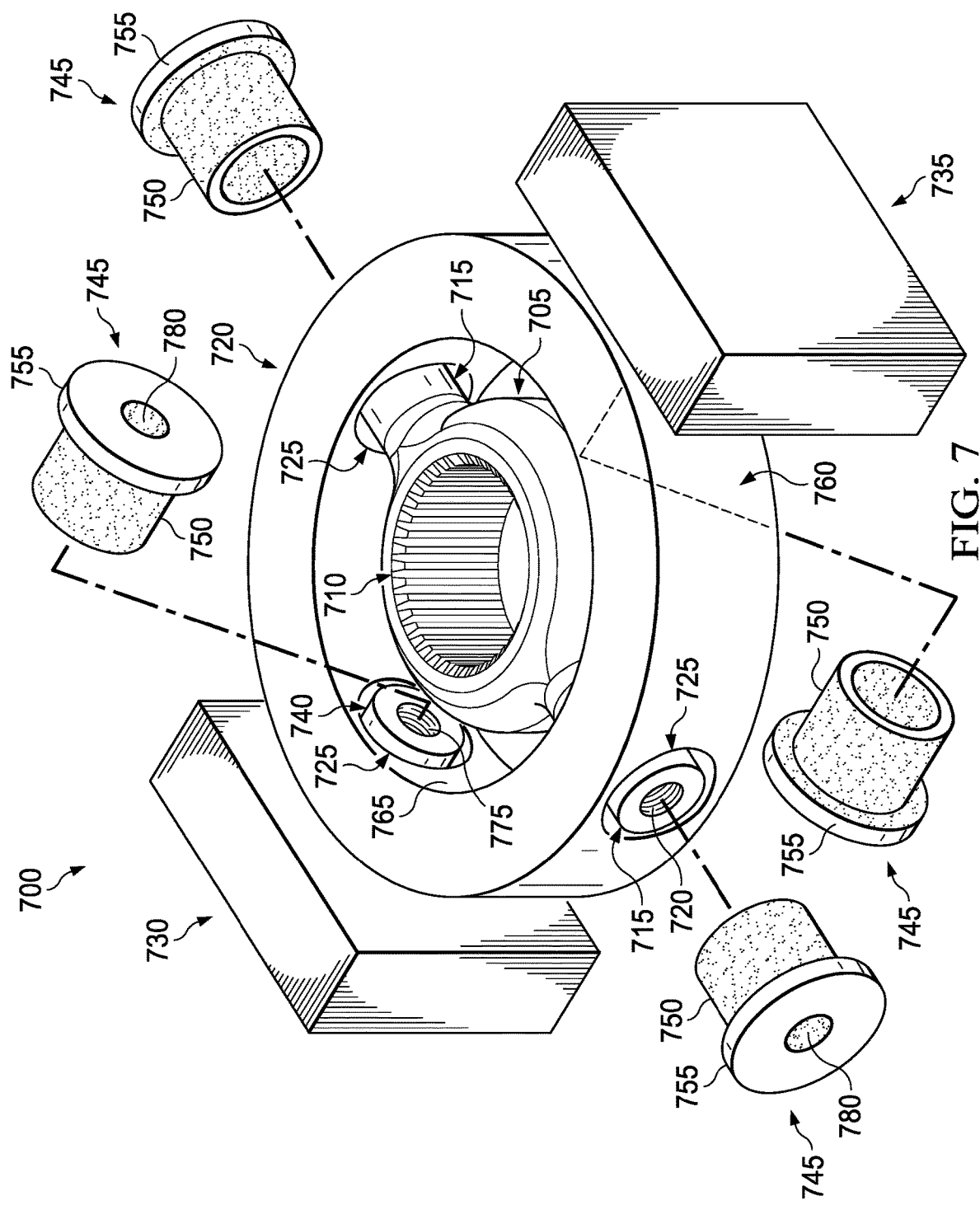
Figure 8:
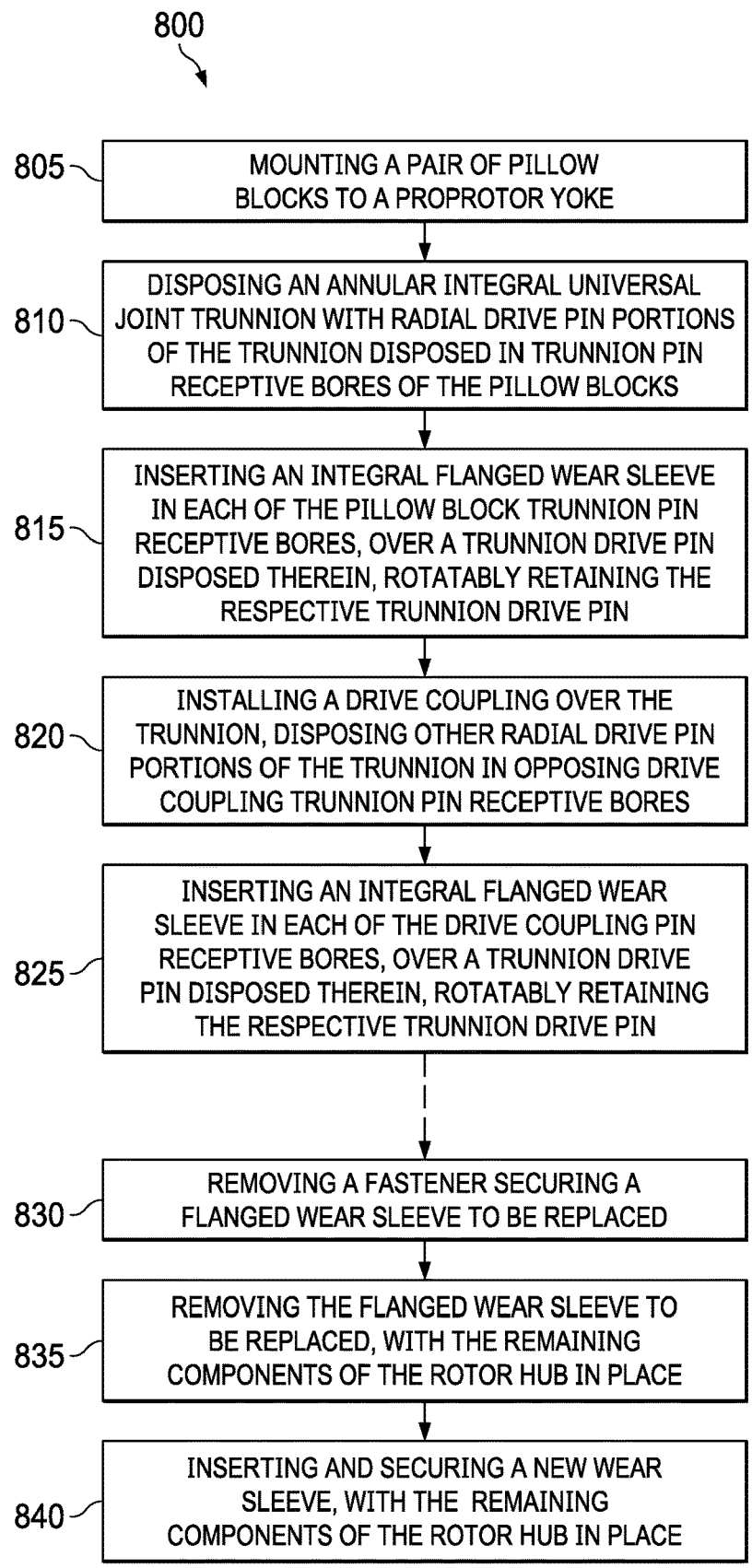

Having thus described the invention in general terms, reference will now be made to the accompanying drawings, which are not necessarily drawn to scale and which are incorporated in and form part of the specification and in which like numerals designate like parts, illustrate embodiments of the present invention and together with the description, serve to explain the principles of the invention. In the drawings:

FIG. 1 is perspective view of an unmanned tiltrotor aircraft, such as may employ embodiments of the present systems and methods;

FIG. 2 is a diagrammatic perspective view of a portion of a rotor hub assembly of a rotorcraft such as the unmanned tiltrotor aircraft of FIG. 1, showing a bearingless gimbaled rotor hub Hooke's joint, in accordance with at least one embodiment of the present systems and methods;

FIG. 3 is a diagrammatic perspective view of a trunnion of the bearingless gimbaled rotor hub Hooke's joint 205 of FIG. 2, in accordance with at least one embodiment of the present systems and methods;

FIG. 4 is fragmented, generally cross-sectional diagrammatic side view of the portion of the rotor hub assembly of FIG. 2 also showing the bearingless gimbaled rotor hub Hooke's joint, in accordance with at least one embodiment of the present systems and methods;

FIG. 5 is another fragmented, generally cross-sectional diagrammatic side view of the portion of the rotor hub assembly of FIG. 2 also showing the bearingless gimbaled rotor hub Hooke's joint, in accordance with at least one embodiment of the present systems and methods;

FIG. 6 is fragmented, partially exploded diagrammatic perspective view of another bearingless gimbaled Hooke's joint, according to at least one other embodiment of the present systems and methods;

FIG. 7 is fragmented, partially exploded diagrammatic perspective view of a further bearingless gimbaled Hooke's joint, according to at least one further embodiment of the present systems and methods; and FIG. 8 is a flowchart of an example process for gimbaling a rotor hub, according to at least one implementation of the present systems and methods While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

The present systems and methods relate generally to rotorcraft, more particularly to rotorcraft rotor hubs, and specifically to bearingless gimbaled rotor hubs and swashplates. In accordance with embodiments of the present systems and methods, an aircraft gimbal includes a universal joint trunnion having an annular body with a plurality of drive pins extending therefrom. A pair of pillow blocks secured to a proprotor yoke each define a trunnion pin receptive bore. A drive coupling defines a splined central driveshaft or mast coupling bore and opposing trunnion pin receptive bores. A flanged wear sleeves is disposed in each of the pin receptive bores, over a respective trunnion drive pin, rotatably retaining the respective trunnion drive pin with respect to the respective trunnion pin receptive bore. Each integral flanged wear sleeve has a hollow cylindrical body sized to be retained on one of the trunnion drive pin and to be rotatably retained in one of the trunnion pin receptive bores. A low friction coating or lining is disposed on at least an outer surface of the body.

The present, bearingless gimbaled rotor hubs and swashplates avoid the use of expensive elastomeric or metallic roller/ball bearings, while allowing the rotorcraft to achieve the rotor flapping, teetering, or the like. Embodiments of the present systems and methods employ a wear sleeve that is lined/coated with a low friction material, such as polytetrafluoroethylene (PTFE or Teflon®) instead. Employing embodiments of the present systems and methods make the rotorcraft hub package (and/or the hub and swashplate package) smaller. In accordance with embodiments of the present systems and methods, the wear sleeve attached in an easily removable fashion to be replaced as necessary, without the need to remove and/or replace surrounding parts, proving cost and time savings over expensive traditional elastomeric or metallic roller/ball bearings.

FIG. 1 is perspective view of an unmanned tiltrotor aircraft 100, such as may employ embodiments of the present systems and methods. Rotorcraft 100 features rotor systems 105 and 110, blades 115, a fuselage 120, landing gear 125, and wing 130. Rotor systems 105 and 110 may rotate blades 115. Rotor systems 105 and 110 may include a control system for selectively controlling pitch of each blade 115 in order to selectively control direction, thrust, and lift of rotorcraft 100. In the example of FIG. 1, rotorcraft 100 is a tiltrotor aircraft, and rotor systems 105 and 110 take the form of rotatable nacelles. In this example, the position of (at least the rotor portion and driveshafts/masts of) nacelles 105 and 110, as well as the pitch of rotor blades 115 (as well as tip portions 135 and 140 of wing 130), can be selectively and separately controlled in order to selectively control direction, thrust, and lift of tiltrotor aircraft 100. Fuselage 120, the main body of rotorcraft 100, may be coupled to rotor systems 105 and 110 (e.g., via wing 130) such that rotor systems 105 and 110 and blades 115 may move fuselage 120 through the air. Landing gear 125 supports rotorcraft 100 when rotorcraft 100 is landing and/or when rotorcraft 100 is at rest on the ground. Various embodiments of the present systems and methods relating to rotor systems described herein may apply to rotor systems 105 and 110 and/or other rotor systems, such as non-tilting rotor, helicopter rotor systems, aircraft other than rotorcraft, such as airplanes and unmanned (drone) aircraft, or the like.

In the example of FIG. 1, tiltrotor aircraft 100 may operate in a helicopter mode by tilting (at least the rotor portion and driveshafts/masts of) nacelles 105 and 110 upright (including, in some embodiments tip portions 135 and 140 of wing 130), as shown with respect to nacelle 105 (and wing tip 135). Tiltrotor aircraft 100 may operate in an airplane mode by tilting the (rotor portion and driveshafts/masts of the) nacelles (and in some embodiments tip portions 135 and 140 of wing 130) forward, as nacelle 110 (and wing tip 140) is shown. Tiltrotor aircraft 100 may operate in a transition flight or conversion mode by tilting the (rotor portion and driveshafts/masts of) nacelles (and wingtips) between the upright and forward orientations. Tiltrotor aircraft 100 may generate greater forward speed in airplane mode than in helicopter mode because, in airplane mode, blades 115 are oriented to generate greater thrust propelling the aircraft forward (somewhat analogous to a propeller). While in helicopter mode tiltrotor aircraft 100 can take off and land vertically, hover and fly sideward.

As noted, designs of rotors and propellers for aircraft are often (extremely) complex. A large number of factors must be taken into account, including flexure of the rotor under heavy loads and the required motions of the rotorblades with respect to the drive mechanism. The considerations for proprotors, used as both propellers and rotors in aircraft such as tiltrotor aircraft 100, can be more complex than usual. Gimbaled rotors may be used in such aircraft. In a gimbaled rotor, joints must be provided between the driveshaft/mast that carries torque from the engine and the yoke that drives the blades, giving rise to a relatively complex hub assemblies subject to considerable forces in such joints.

In accordance with embodiments of the present systems and methods, a gimbal joint may employ a first set of integral flanged wear sleeves. Each of these integral flanged wear sleeves may be disposed between a pin or pin receptive bore of a first structure and a corresponding respective pin receptive bore or pin of a second structure. The first such structure may be adapted to rotate in a single plane and the second such structure may be adapted to rotate in the single plane and tilt relative to the single plane, about a first axis parallel to the single plane. A second set of the integral flanged wear sleeves may each be disposed between another pin or pin receptive bore of the second structure and a corresponding respective pin receptive bore or pin of a third structure. This third structure may be adapted to rotate in the single plane and tilt relative to the single plane, about a second axis parallel to the single plane and generally perpendicular to the first axis.

The present systems and methods are described herein with reference to a rotorcraft rotor (proprotor) hub. However, various embodiments of the present systems and methods are applicable to not only aircraft rotor or propeller hub assemblies, but also to swashplate assemblies used to control rotor or propeller pitch. To wit, FIG. 2 is a diagrammatic perspective view of a portion of a rotor hub assembly 200 of a rotorcraft such as unmanned tiltrotor aircraft 100 of FIG. 1, showing bearingless gimbaled rotor hub Hooke's or "universal" joint 205, in accordance with at least one embodiment of the present systems and methods. FIG. 3 is a diagrammatic perspective view of trunnion 210 of bearingless gimbaled rotor hub Hooke's or "universal" joint 205 of FIG. 2, in accordance with at least one embodiment of the present systems and methods. FIG. 4 is fragmented, generally cross-sectional diagrammatic side view of the portion of rotor hub assembly 200 of FIG. 2 also showing bearingless gimbaled rotor hub Hooke's or universal joint 205, in accordance with at least one embodiment of the present systems and methods. FIG. 5 is another fragmented, generally cross-sectional diagrammatic side view of the portion of rotor hub assembly 200 of FIG. 2 also showing the bearingless gimbaled rotor hub Hooke's or universal joint, in accordance with at least one embodiment of the present systems and methods.

Rotor hub gimbal 205 includes a "first structure," such as drive coupling 215, which in accordance with such embodiments, adapted to rotate in a single plane, such as by virtue of being splined onto a driveshaft/mast of the aircraft. To wit, drive coupling 215 defines splined central driveshaft/mast coupling bore 220 configured to mate with a rotor driveshaft/mast end. Drive coupling 215 also defines opposing trunnion pin receptive bores 505 (best seen in FIG. 5).

Rotor hub gimbal embodiment 205 also includes a "second structure," such as integral universal joint trunnion 210, which may, in some embodiments and implementations be referred to as a "universal joint cross." Trunnion 210, is, in accordance with such embodiments, adapted to rotate in the aforementioned single plane and tilt relative to the single plane, about a first axis parallel to the single plane, such as by virtue of being rotatably pined to drive coupling 215. As may be best seen in FIG. 3, integral trunnion 210 may comprise generally cylindrical annular body portion 225, which in some embodiments may be torus-shaped (i.e.

doughnut-shaped), defining central driveshaft/mast opening 305. Generally cylindrical drive pin portions 310 extend radially from annular body portion 225. Each drive pin portion 310 of integral universal joint trunnion 210 may include a threaded longitudinal bore 315.

Returning to FIG. 2, in the illustrated embodiment, a pair of pillow blocks 230 and 235 are secured to a "third structure," such as proprotor yoke 240. In accordance with such embodiments, proprotor yoke 240 is adapted to rotate in the aforementioned single plane and tilt relative to the single plane, about a second axis parallel to the single plane and generally perpendicular to the first axis about which the second structure trunnion 210 tilts.

In the illustrated embodiment of FIGS. 2 through 5, each pillow block defines a trunnion pin receptive bore 405 or 410 (best seen in FIG. 4). However, in other embodiments the pin receptive bores may be defined by the third structure proprotor yoke itself. Each illustrated pillow block may, as illustrated, comprise two halves, halves 245 and 250 making up pillow block 230 and halves 255 and 260 making up pillow block 235. Each of pillow block halves 245, 250, 255 and 260, is configured to be secured to proprotor yoke 240, such as by a bolt deployed in recesses 245a and 255a (and corresponding hidden recesses) of pillow block halves 245 and 255. Pillow block halves 245 and 250 mate to define pin receptive bore 405, while pillow block halves 255 and 260 mate to define pin receptive bore 410, in the illustrated embodiment. The horizontal split between the pillow block halves allows control an amount of compression on the wear sleeve. Shims may be employed between the pillow block halves to control that compression. However, each of pillow blocks 230 and 235 may be a single piece, defining pin receptive bores 405 and 410.

Integral flanged wear sleeves 265, which may be identical, are disposed in each of pillow block trunnion pin receptive bores 405 and 410, and each of drive coupling trunnion pin receptive bores 505, over respective trunnion drive pins 310. Integral flanged wear sleeves 265 rotatably retain respective trunnion drive pin 310 with respect to respective pillow block trunnion pin receptive bore 405 or 410, or respective drive coupling trunnion pin receptive bore 505. Each integral flanged wear sleeve 265 comprises right circular hollow cylindrical body portion 415, which may be interiorly sized to be retained on one of trunnion drive pin portions 310 of universal joint trunnion 210 and externally sized to be rotatably retained in pillow block trunnion pin receptive bores 405 and 410 and drive coupling trunnion pin receptive bores 505. Flange portion 270, radiating from an "outer" end of cylindrical body portion 415, has a diameter larger than a diameter of pillow block trunnion pin receptive bores 405, 410 and drive coupling trunnion pin receptive bores 505, bearing on a face (275 shown) of pillow blocks 230, 235 or a face (280 shown) of drive coupling. A low friction coating or lining, such as PTFE, or the like, is disposed on at least outer surface 420 of body portion 415 of each integral flanged wear sleeve 265 and may be disposed on inner face 425 of flanges 270. In some embodiments, the low friction coating or lining may, additionally or alternatively, be disposed on at least inner cylindrical surface 430 of each wear sleeve 265.

Each structure pin may also define a longitudinal bore, in such embodiments the gimbal joint may employ a fastener secured in each such longitudinal bore, bearing on, and tensioned against, the respective wear sleeve flange to replaceably retain the respective wear sleeve on the respective pin and in the respective pin receptive bore. In such embodiments, the right circular hollow cylindrical body portion is interiorly sized to be retained on one of the pins and externally sized to be rotatably retained in one of the pin receptive bores. To wit, a fastener, such as illustrated bolt 285, may be secured in (e.g. threaded and tightened into) each trunnion drive pin longitudinal (threaded) bore 315, so as to bear on and tension against the respective wear sleeve flange 270, thereby replaceably retaining respective wear sleeve 265 on respective trunnion drive pin 310 and replaceably retaining flanged wear sleeve 265 and trunnion 210 in place. Thereby, gimbaled rotor hub 200 is configured to enable removal of one fastener 285 to allow removal and replacement of a respective wear sleeve 265, one at a time, without removal of rotor hub gimbal 205 or any other components thereof. Further, a low friction coating or lining, may, such as described above, be disposed on an outer surface of the body portion and on an inner face of the flange portion of each wear sleeve, in such embodiments. Alternatively, right circular hollow cylindrical body portion 415 of each wear sleeve 265 may be interiorly sized to be rotatably retained on one of the pins and externally sized to be retained in one of the pin receptive bores.

In accordance with the foregoing, a gimbaled rotor hub (200) may have a proprotor yoke (240), configured to radially mount a plurality of proprotors and defining a central driveshaft/mast opening (290), with a rotor hub gimbal 205 rotatably mounted on the proprotor yoke (240) and coupled to a driveshaft/mast of the aircraft. To facilitate tilting of the gimbaled rotor hub (200) on the driveshaft/mast the proprotor yoke central driveshaft/mast opening (290) is larger than the annular body central driveshaft/mast opening (305), which is larger in diameter than the drive coupling splined opening (220), thereby allowing tilting of proprotors secured to the proprotor yoke, for purposes such as rotor flapping or teetering.

FIG. 6 is fragmented, partially exploded diagrammatic perspective view of other bearingless gimbaled Hooke's joint 600, according to at least one other embodiment of the present systems and methods. Therein, a "first structure," in this case integral trunnion 605, is, in accordance with such embodiments, adapted to rotate in a single plane, such as by virtue of being splined onto a driveshaft/mast of an aircraft. To this end, trunnion 605 defines integral internally splined central driveshaft/mast coupling bore portion 610 configured to mate with a rotor driveshaft/mast end. Trunnion 605 also defines opposing integral trunnion pin portions 615.

Bearingless gimbaled Hooke's joint 600 also includes a "second structure," such as integral coupling 620, which in accordance with such embodiments, adapted to rotate in the aforementioned single plane, and tilt relative to the single plane, about a first axis parallel to the single plane, such as by virtue of being rotatably pined to trunnion 605. As illustrated, coupling 620 may be "ring-shaped" and may define integral pin receptive bore portions 625 for rotatably pinning to trunnion 605, via trunnion pins 615. Coupling embodiment 620 also defines integral coupling pin portions 630.

"Third structures," which in FIG. 6 are illustrated as pillow blocks 635 and 640 are, in accordance with such embodiments, adapted to rotate in the aforementioned single plane and tilt relative to the single plane, about a second axis parallel to the single plane and generally perpendicular to the first axis about which second structure ring coupling 620 tilts. Each pillow block 635 and 640 defines a coupling pin receptive bore, 645 and 650, respectively. In various embodiments pillow blocks 635 and 640 may be secured to, or be an integral part of, a proprotor yoke, or the like, of the aircraft.

Integral flanged wear sleeves 655, similar to (or the same as) integral flanged wear sleeve 265, may be identical. Integral flanged wear sleeves 655 are each adapted to be disposed in each of coupling ring pin receptive bores 625, and each of pillow block pin receptive bores 645 and 650, over respective trunnion drive pins 615, or coupling ring drive pins 630, respectively. Integral flanged wear sleeves 655 rotatably retain respective trunnion drive pin 615 with respect to respective coupling ring pin receptive bore 625, or respective coupling ring drive pin 630 with respect to respective pillow block pin receptive bore 645 or 650, coupling trunnion 605 to the third structure, such as a proprotor yoke of the aircraft.

Again, each integral flanged wear sleeve 655 comprises right circular hollow cylindrical body portion 660, which may be interiorly sized to be retained on one of trunnion or coupling drive pin portions 615 or 630 and externally sized to be rotatably retained in coupling bore 625 or pillow block bore 645 or 650. Flange portion 665, radiates from an "outer" end of cylindrical body portion 660 and has a diameter larger than a diameter of coupling or pillow block pin receptive bores 625, 645 or 650, for bearing, at least in part on outer surface 670 of coupling ring 620 or a face (675 shown) of pillow blocks 635 or 640. Again, a low friction coating or lining, such as PTFE, or the like, may be disposed on at least an outer surface of body portion 660 of each integral flanged wear sleeve 655 and may be disposed on inner face of flanges 665. In some embodiments, the low friction coating or lining may, additionally or alternatively, be disposed on at least inner cylindrical surface of each wear sleeve 655.

FIG. 7 is fragmented, partially exploded diagrammatic perspective view of further bearingless gimbaled Hooke's joint 700, according to at least one further embodiment of the present systems and methods. In accordance with such embodiments, a "first structure," such as illustrated integral trunnion 705, is adapted to rotate in a single plane, such as for being splined onto a driveshaft/mast of an aircraft. To wit, trunnion 705 defines integrally internally splined central driveshaft/mast coupling bore portion 710 configured to mate with a rotor driveshaft/mast end. Trunnion 705 also defines opposing integral 710 trunnion pin portions 715.

Bearingless gimbaled Hooke's joint 700 also includes a "second structure," illustrated integral ring coupling 720, which in accordance with such embodiments, is adapted to rotate in the aforementioned single plane, and tilt relative to the single plane, about a first axis parallel to the single plane, such as by being rotatably pined to trunnion 705. As illustrated, coupling 720 may be "ring-shaped" and may define integral pin receptive bore portions 725 for rotatably pinning to trunnion 705, via trunnion pins 715 and rotatably pinning to mounting blocks 730 and 735, via respective mounting pins (mounting block 730 pin 740 shown).

Mounting block "third structures" 730 and 735 are adapted to rotate in the aforementioned single plane and tilt relative to the single plane, about a second axis parallel to the single plane and generally perpendicular to the first axis about which second structure ring coupling 720 tilts, in accordance with such embodiments. Each mounting block 730 and 735 defines the aforementioned mounting pin (mounting pin 740 of mounting block 730 shown. In various embodiments mounting blocks 730 and 735 may be secured to, or be an integral part of, a proprotor yoke, or the like, of the aircraft.

Integral flanged wear sleeves 745, similar to (or the same as) integral flanged wear sleeve 265 or 655, may be idenical. Integral flanged wear sleeves 745 are each adapted to be disposed in each of coupling ring pin receptive bores 725 over respective trunnion drive pins 715 or the mounting pins (740). Integral flanged wear sleeves 745 rotatably retain respective trunnion drive pin 715 or the respective mounting pin (740) with respect to the respective coupling ring pin receptive bore 725, coupling trunnion 705 to the third structure mounting blocks 730 and 735, and thereby to a proprotor yoke of the aircraft, or the like.

Again, each integral flanged wear sleeve 745 comprises right circular hollow cylindrical body portion 750, which may be interiorly sized to be retained on one of trunnion or mounting block pin portions 715, 730 etc. and externally sized to be rotatably retained in coupling bores 725 of coupling ring 720. Flange portion 755, radiates from an "outer" end of cylindrical body portion 750 and has a diameter larger than a diameter of coupling ring pin receptive bores 725, for bearing, at least in part on outer or inner surface 760 or 765 of coupling ring 720. Again, a low friction coating or lining, such as PTFE, or the like, may be disposed on at least an outer surface of body portion 750 of each integral flanged wear sleeve 745 and may be disposed on inner face of flanges 755. In some embodiments, the low friction coating or lining may, additionally or alternatively, be disposed on at least inner cylindrical surface of each wear sleeve 745.

Again, in each of embodiments 600 and 700, each structure pin may also define a longitudinal bore 680 or 685 and 770 or 775, respectively. In such embodiments the gimbal joint may employ a fastener (not shown) passing through wear sleeve orifice 690 or 780 and secured in each such longitudinal bore, bearing on, and tensioned against, the respective wear sleeve flange 665 or 755 to replaceably retain the respective wear sleeve 655 or 745 on the respective pin and in the respective pin receptive bore.

A process for gimbaling a rotor hub, swashplate, or the like, may, for example include disposing integral flanged wear sleeves between pins or pin receptive bores of a first structure and corresponding pin receptive bores or pins of a second structure. This first structure may be adapted to, for example rotate in a single plane and the second structure may, for example, be adapted to rotate in the single plane and tilt relative to the single plane about a first axis parallel to the single plane. Other integral flanged wear sleeves may be disposed between other pins or pin receptive bores of the first structure and corresponding pin receptive bores or pins of a third structure. This third structure may be adapted to rotate in the single plane and tilt relative to the single plane about a second axis parallel to the single plane and perpendicular to the first axis.

In accordance with such implementations, a rotor hub implementation, or the like may call for the first structure to be splined to a mast or driveshaft of a proprotor aircraft, and proprotors of the aircraft may be mounted to the third structure, such as a proprotor yoke. To such an end, FIG. 8 flowcharts example process 800 for gimbaling a rotor hub, according to at least one implementation of the present systems and methods. Therein, a pair of pillow blocks (230, 235) are mounted to a proprotor yoke (240, a "third structure"), at 805. Each pillow block defines a trunnion pin receptive bore (405, 410), and the proprotor yoke defines a central driveshaft/mast opening (290). Each of the pillow blocks may comprise two halves (245, 250, 255, 260), and mounting each of the pillow blocks at 805 may be carried out by mating and securing each half to the proprotor yoke, defining the respective pillow block pin receptive bore.

At 810, a rotor hub gimbal annular universal joint trunnion (210, a "second" structure) defining a central driveshaft/mast opening (305), aligned with the proprotor yoke central driveshaft/mast opening (290), is disposed with radial drive pins (310) of the trunnion disposed in the trunnion pin receptive bores (405, 410) of the pillow blocks (230, 235). Mounting each of the pillow blocks stacked one upon the other, at 805, may thereby capture one of the trunnion pins in each of the pillow block pin receptive bores, to carry out general disposition of the trunnion at 810.

An integral flanged wear sleeve (265), such as described above, is inserted into each of the pillow block trunnion pin receptive bores (405, 410), over each respective trunnion drive pin (310) disposed therein, at 815. This rotatably retains the respective trunnion drive pins, and thereby the trunnion (210), with respect to the respective pillow block trunnion pin receptive bore, and hence the pillow blocks (230, 235). Additionally, or alternatively, mounting each of the pillow blocks, stacked one upon the other, at 805 may capture the flanged wear sleeves, on a trunnion pin, in each of the pillow block pin receptive bores.

At 820, a drive coupling (215, a "first" structure) is installed over the trunnion (210), disposing other radial drive pins (310) of the trunnion (210) in opposing drive coupling trunnion pin receptive bores (505).

Integral flanged wear sleeves (265), such as described above, are inserted into each of the drive coupling pin receptive bores (505), over a trunnion drive pin (310) disposed therein at 825. This rotatably retains the respective trunnion drive pin with respect to the respective drive coupling trunnion pin receptive bore, and thus rotatably retaining the trunnion (210) with respect to the drive coupling (215).

Thereafter, and/or 815 and/or 825, the installed flanged wear sleeves are secured, such as by a fastener, such as a bolt, being secured in (e.g. threaded into and tighten) each trunnion drive pin longitudinal (threaded) bore 315. Thusly, the fastener bears on, and tensions against, the respective wear sleeve flange (270) to thereby replaceably retain the respective wear sleeve (265) on the respective trunnion drive pin (310) and replaceably retain the flanged wear sleeve and trunnion (210) in place.

At 820, or thereafter, a splined central driveshaft/mast coupling bore (220) centrally defined by the drive coupling (215) is mated with a rotor driveshaft/mast of an aircraft to operatively mount the gimbaled rotor hub (200). Tilting of the gimbaled rotor hub on the driveshaft/mast and tilting of proprotors secured to the proprotor yoke is allowed by the proprotor yoke central driveshaft/mast opening (290) being larger than the annular body central driveshaft/mast opening (305), and the annular body central driveshaft/mast opening being larger than the drive coupling splined opening (220) (and hence larger that the aircraft driveshaft/mast).

Various ones of the above steps may be performed in one or other progressions. For example, the trunnion (210) may be deployed first, then the pillow blocks (230, 235) may be mounted around the pins (310). In such an implementation, the drive coupling (215) may be assembled on the trunnion, then the pillow blocks may be assembled around the remaining trunnion pins.

Removal and replacement of a flanged wear sleeve (265) may be carried out at 830 through 840, as required. At 830 a fastener (bolt 285) securing a flanged wear sleeve to be replaced is removed (e.g. screwed out of respective trunnion pin bore 315). The wear sleeve to be replaced is removed (pulled out of bore 405, 410 or 505) at 835, with the remaining components of the gimballed rotor hub (200) remaining in place. That is, at 835, the wear sleeve to be replaced is removed without removal of the rotor hub gimbal, any of the other wear sleeves, or any other components of the gimballed rotor hub. At 840, the respective wear sleeve is replaced by inserting a new integral flanged wear sleeve in the respective pin receptive opening (405, 410, 505) on the respective trunnion pin 310, as in 815 or 825 above, and securing the wear sleeve with a (threaded) fastener (such as by tightening the fastener into threaded bore 315 of the trunnion pin) as in 835, above. Thereby, replacement of a wear sleeve used in the present systems and methods may be accomplished, with the remaining components of the rotor hub in place, that is, without removal of the rotor hub gimbal or any other components thereof.

In a rotorcraft, or other aircraft with propeller pitch control, or the like, a swashplate may translate flight control input into motion of blades 115, or the like. Because blades 115 are typically spinning when the rotorcraft is in flight, the swashplate may, transmit flight control input from the non-rotating fuselage to hub 200, proprotor yoke 240, blades 115, and/or components coupling hub 200 to blades 115. To this end, such a swashplate may be operatively coupled to proprotor yoke 240, or the like by a plurality of pitch links. This coupling between a pitch link and a proprotor yoke may also include, but are not limited to, couplings between a pitch link and a blade or components coupling the proprotor yoke to blades 115. In various embodiments, a swashplate assembly may include a non-rotating swashplate ring and a rotating swashplate ring. Non-rotating swashplate ring does not rotate with the rotorcraft driveshaft or mast, whereas rotating swashplate ring does rotate with the driveshaft or mast. In such embodiments, the pitch links connect rotating swashplate ring to blades 115, such as via proprotor yoke 240.

In operation, according to one example embodiment, translating the non-rotating swashplate ring along an axis of the driveshaft or mast causes the pitch links to move up or down. This changes the pitch angle of all of blades 115 equally, increasing or decreasing the thrust of the rotor, and in the case of a helicopter or tiltrotor craft 100 in helicopter mode, causing the aircraft to ascend or descend. Tilting the non-rotating swashplate ring causes the rotating swashplate to tilt, moving the pitch links up and down cyclically as they rotate with the driveshaft or mast. This tilts the thrust vector of the rotor, causing rotorcraft 100 to translate horizontally following the direction the swashplate is tilted. To facilitate such tilting of the rotating swashplate, it may be gimbaled, similar to hub 200.

As noted, the present systems and methods are described above with reference to a rotorcraft rotor (proprotor) hub. However, various embodiments of the present systems and methods are applicable to not only aircraft rotor or propeller hub assemblies, but also to swashplate assemblies to gimbal a rotating swashplate, or the like, facilitating tilting of the rotating swashplate, as well as movement of the rotating swashplate along the driveshaft or mast. For example, in a swashplate implementation, or the like, a first structure may be splined to a mast or driveshaft of a proprotor aircraft for movement along the mast or driveshaft, perpendicular to the aforementioned single plane. A second structure and/or third structure (e.g. making up the rotating swashplate ring) may be adapted to rotate in the single plane and tilt relative to the single plane, about first and second (respective axes), parallel to the single plane and may be linked to proprotors of the aircraft and the non-rotating ring.

Hence, although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A gimbal joint comprising:
a first plurality of integral flanged wear sleeves, each integral flanged wear sleeve disposed between one pin of opposing pin portions of an integral trunnion and a corresponding pin receptive bore of an integral coupling, the integral trunnion defining an integral internally splined central driveshaft or mast coupling bore portion configured to mate with a rotor driveshaft or mast end and spline the integral trunnion to a mast or driveshaft of an aircraft for movement along the mast or driveshaft perpendicular to a single plane and adapted to rotate in the single plane and the integral coupling adapted to move along the mast or driveshaft, rotate in the single plane and tilt relative to the single plane about a first axis parallel to the single plane;
a second plurality of integral flanged wear sleeves, each disposed between another pin or pin receptive bore of the integral trunnion and a corresponding pin receptive bore or pin of a pillow or mounting block, the block adapted to rotate in the single plane and tilt relative to the single plane about a second axis parallel to the single plane and perpendicular to the first axis;
each integral flanged wear sleeve comprising:
a right circular hollow cylindrical body portion interiorly sized to be retained on one of the pins and externally sized to be retained in one of the pin receptive bores; and
a flange portion radiating from an outer end of the cylindrical body portion, the flange portion having a diameter larger than a diameter of the pin receptive bores and bearing on a face of a respective structure.

2. The gimbal of claim 1, wherein at least one of the flanged wear sleeves further comprises:
a low friction coating or lining disposed on at least an outer surface of the body portion;
a low friction coating or lining disposed on an inner surface of the body portion of the at least one flanged wear sleeve; and/or
a low friction coating or lining disposed on an inner face of a flange portion of the at least one flanged wear sleeve.

3. The gimbal joint of claim 1, wherein each pin further comprises a longitudinal bore, and the gimbal joint further comprises a fastener secured in each longitudinal bore, bearing on, and tensioned against, the respective wear sleeve flange, replaceably retaining the respective wear sleeve on the respective pin and in the respective pin receptive bore.

4. The gimbal joint of claim 1, wherein the right circular hollow cylindrical body portion is interiorly sized to be retained on one of the pins and externally sized to be rotatably retained in one of the pin receptive bores.

5. The gimbal joint of claim 1, wherein the right circular hollow cylindrical body portion is interiorly sized to be rotatably retained on one of the pins and externally sized to be retained in one of the pin receptive bores.

6. The gimbal joint of claim 1, wherein:
the integral coupling is ring-shaped, defines integral pin receptive bore portions configured for rotatably pinning to the integral trunnion via the trunnion pins, and defines integral coupling pin portions;
the pillow or mounting block comprises a plurality of pillow blocks, each pillow block defining a coupling pin receptive bore and secured to, or an integral part of, a rotor yoke of the aircraft; and
one of each of the first or second plurality of integral flanged wear sleeves is disposed in each coupling ring pin receptive bores and in each pillow block pin receptive bore, over respective trunnion drive pins or coupling ring drive pins, rotatably retaining the respective trunnion drive pin with respect to the respective coupling ring pin receptive bore, or the respective coupling ring drive pin with respect to the respective pillow block pin receptive bore, coupling the integral trunnion to the rotor yoke of the aircraft.

7. The gimbal joint of claim 1, wherein:
the pillow or mounting block comprises a plurality of mounting blocks, each mounting block defining a mounting pin and secured to, or an integral part of, a rotor yoke of the aircraft;
the integral coupling is a ring-shaped integral ring coupling and defines a plurality of integral pin receptive bore portions configured for rotatably pinning to the integral trunnion via the trunnion pins and rotatably pinning to the mounting blocks via respective mounting pins; and
one of each of the first or second plurality of integral flanged wear sleeves is disposed in each integral ring coupling pin receptive bores over a respective trunnion drive pin or mounting block pins, rotatably retaining the respective trunnion drive pin or mounting block pin with respect to the respective integral ring coupling pin receptive bore, coupling the integral trunnion to the mounting blocks and thereby to a rotor yoke of the aircraft.

8. An aircraft gimbal comprising:
an integral trunnion comprising:
an annular body portion defining a central splined central driveshaft or mast coupling bore configured to mate with a rotor driveshaft or mast end and spline the integral trunnion to the mast or driveshaft for movement along the mast or driveshaft, perpendicular to a single plane; and
a plurality of opposing integral trunnion drive pin portions extending from the annular body portion;
a pair of blocks configured to be secured to, or is an integral part of, a rotor yoke;
an integral coupling defining:
opposing trunnion pin receptive bores; and
a plurality of integral flanged wear sleeves, one integral flanged wear sleeve disposed in each of the integral coupling trunnion pin receptive bores, over a respective trunnion drive pin, rotatably retaining the respective trunnion drive pin with respect to the respective integral coupling trunnion pin receptive bore, each integral flanged wear sleeve comprising:
a right circular hollow cylindrical body portion interiorly sized to be retained on one of the trunnion drive pin portions of the trunnion and externally sized to be rotatably retained in one of the pillow block trunnion pin receptive bores and/or one of the drive coupling trunnion pin receptive bores; and a flange portion radiating from an outer end of the cylindrical body portion, the flange portion having a diameter larger than a diameter of the pillow block trunnion pin receptive bores and the drive coupling trunnion pin receptive bores, bearing on a face of a respective pillow block or a respective face of the drive coupling.

9. The gimbal of claim 8, wherein at least one of the flanged wear sleeves further comprise:

a low friction coating or lining disposed on at least an outer surface of the body portion;

a low friction coating or lining disposed on an inner surface of the body portion of the at least one flanged wear sleeve; and/or a low friction coating or lining disposed on an inner face of a flange portion of the at least one flanged wear sleeve.

10. The gimbal of claim 8, wherein each drive pin portion of the integral trunnion further comprises a longitudinal bore, and the rotor hub gimbal further comprises a fastener secured in each trunnion drive pin longitudinal bore and bearing on, and tensioned against, the respective wear sleeve flange, replaceably retaining the respective wear sleeve on the respective integral trunnion drive pin and replaceably retaining the flanged wear sleeve and integral trunnion in place.

11. The gimbal of claim 8, wherein:

the integral coupling is ring-shaped and further defines integral coupling pin portions;

the blocks are pillow blocks, each pillow block defining a coupling pin receptive bore; and one integral flanged wear sleeves is disposed in each pillow block pin receptive bore, over respective integral coupling ring drive pins, rotatably retaining the respective coupling ring drive pin with respect to the respective pillow block pin receptive bore, coupling the integral trunnion to the rotor yoke.

12. The gimbal of claim 8, wherein:

the blocks are mounting blocks, each mounting block defining a mounting pin;

the integral coupling is a ring-shaped integral ring coupling and the pin receptive bore portions are configured for rotatably pinning to the integral trunnion via the trunnion pins and rotatably pinning to the mounting blocks via respective mounting pins; and integral flanged wear sleeves are disposed in integral ring coupling pin receptive bores over respective mounting block pins, rotatably retaining the respective mounting block pin with respect to the respective integral ring coupling pin receptive bore, coupling the integral trunnion to the mounting blocks and thereby to the rotor yoke.

13. A proprotor gimbal, comprising:

a yoke configured for mounting a plurality of proprotors thereto;

a pair of blocks attached to the yoke;

an integral coupling having a pair of opposed bores, each with a flanged wear sleeve, the integral coupling rotatably pinned to the pair of blocks; and, an integral trunnion comprising an annular body defining an integral internally splined mast bore configured to mate with a rotor mast end and spline the integral trunnion to the mast or driveshaft for movement along the mast or driveshaft, perpendicular to a single plane, and defining a pair of opposed trunnion pin portions extending outwardly from the annular body, each trunnion pin extending into one of the flanged wear sleeves in the integral coupling opposed bores; and, each flanged wear sleeve comprising a right circular hollow cylindrical body portion interiorly sized to be retained on one of the trunnion pins and externally sized to be rotatably retained in one of the integral coupling opposed bores.

14. The proprotor gimbal of claim 13, wherein at least one of the flanged wear sleeves further comprises:

a low friction coating or lining disposed on at least an outer surface of the body portion;

a low friction coating or lining disposed on an inner surface of the body portion of the at least one flanged wear sleeve; and/or a low friction coating or lining disposed on an inner face of a flange portion of the at least one flanged wear sleeve.

15. The proprotor gimbal of claim 13, wherein:

the integral coupling is ring-shaped, defines integral pin receptive bore portions configured for rotatably pinning to the integral trunnion via the trunnion pins, and defines integral coupling pin portions;

the blocks are pillow blocks and each pillow block defines a coupling pin receptive bore; and one of the flanged wear sleeves is disposed in each coupling ring pin receptive bore and in each pillow block pin receptive bore, over a respective trunnion drive pin or coupling ring drive pin, rotatably retaining the respective trunnion drive pin with respect to the respective coupling ring pin receptive bore, or the respective coupling ring drive pin with respect to the respective pillow block pin receptive bore, coupling the integral trunnion to the yoke.

16. The proprotor gimbal of claim 13, wherein:

the blocks are mounting blocks, each mounting block defining a mounting pin;

the integral coupling is a ring-shaped integral ring coupling and defines a plurality of integral pin receptive bore portions configured for rotatably pinning to the integral trunnion via the trunnion pins and rotatably pinning to the mounting blocks via respective mounting pins; and one of the flanged wear sleeves is disposed in each integral ring coupling pin receptive bore over a respective trunnion drive pin or mounting block pin, rotatably retaining the respective trunnion drive pin or mounting block pin with respect to the respective integral ring coupling pin receptive bore, coupling the integral trunnion to the mounting blocks and thereby to the yoke.

17. The proprotor gimbal of claim 13, wherein each pin further comprises a longitudinal bore; and the proprotor gimbal further comprises a fastener secured in each pin longitudinal bore, the fastener bearing on, and tensioned against, a respective flange portion of each flanged wear sleeve, replaceably retaining the respective flanged wear sleeve on the respective pin.

\* \* \* \* \*